United States Patent
Taheri et al.

(10) Patent No.: US 10,752,342 B2
(45) Date of Patent: Aug. 25, 2020

(54) DEVICE FOR REGULATING THE SPEED OF ROTATION OF A GAS GENERATOR SHAFT OF A ROTORCRAFT TURBOSHAFT ENGINE, A ROTORCRAFT PROVIDED WITH SUCH A DEVICE, AND AN ASSOCIATED METHOD OF REGULATION

(71) Applicant: AIRBUS HELICOPTERS, Marignane (FR)

(72) Inventors: Setareh Taheri, Aix en Provence (FR); Nicolas Certain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 406 days.

(21) Appl. No.: 15/835,575

(22) Filed: Dec. 8, 2017

(65) Prior Publication Data
US 2018/0178908 A1    Jun. 28, 2018

(30) Foreign Application Priority Data
Dec. 22, 2016   (FR) ..................................... 16 01829

(51) Int. Cl.
*B64C 27/12* (2006.01)
*F02C 9/28* (2006.01)
(Continued)

(52) U.S. Cl.
CPC .............. *B64C 27/12* (2013.01); *B64C 27/57* (2013.01); *B64D 31/06* (2013.01); *F02C 3/10* (2013.01);
(Continued)

(58) Field of Classification Search
None
See application file for complete search history.

(56) References Cited

U.S. PATENT DOCUMENTS 6,198,991 B1   3/2001   Yamakawa et al.
7,223,071 B2   5/2007   Certain
(Continued)

FOREIGN PATENT DOCUMENTS

FR   2864028 A1   6/2005
FR   2974564 A1   11/2012
(Continued)

OTHER PUBLICATIONS

French search Report for French application No. FR 1601829, dated Oct. 12, 2017, 7 pages.
(Continued)

*Primary Examiner* — Thomas G Black
*Assistant Examiner* — Ana D Thomas
(74) *Attorney, Agent, or Firm* — Brooks Kushman P.C.

(57) ABSTRACT

A regulator device for regulating a speed of rotation, of a shaft of a gas generator of at least one turboshaft engine of a rotorcraft. The rotorcraft has at least one main rotor for regulating at least lift and/or propulsion for said rotorcraft in the air; a control member for controlling a collective pitch of the blades of said at least one main rotor, said control member serving to generate a control setpoint for said collective pitch; at least one turboshaft engine suitable for driving rotation of said at least one main rotor, said at least one engine producing, at least temporarily, a drive torque that is transmitted to said at least one main rotor; and measurement means for taking at each instant a measurement of said drive torque transmitted by said at least one engine to said at least one main rotor.

11 Claims, 2 Drawing Sheets

(51) Int. Cl.
*B64D 31/06* (2006.01)
*B64C 27/57* (2006.01)
*F02C 9/00* (2006.01)
*F02C 3/10* (2006.01)

(52) U.S. Cl.
CPC .......... *F02C 9/00* (2013.01); *F02C 9/28* (2013.01); *F02D 2200/101* (2013.01); *F02D 2200/1002* (2013.01); *F02D 2200/501* (2013.01); *F02D 2250/18* (2013.01); *F05D 2220/329* (2013.01); *F05D 2270/02* (2013.01); *F05D 2270/052* (2013.01)

(56) References Cited

U.S. PATENT DOCUMENTS

| | | | |
|---|---|---|---|
| 7,976,310 | B2 | 7/2011 | Bachelder et al. |
| 8,442,740 | B2 | 5/2013 | Rossotto |
| 9,073,635 | B2 | 7/2015 | Mezan |
| 9,193,453 | B2 | 11/2015 | Vallart et al. |
| 2007/0118254 | A1 | 5/2007 | Barnes et al. |
| 2008/0294305 | A1* | 11/2008 | Roesch ............ B64C 27/22 701/3 |
| 2013/0221153 | A1 | 8/2013 | Worsham, II et al. |
| 2014/0200790 | A1 | 7/2014 | Massot |

FOREIGN PATENT DOCUMENTS

| | | |
|---|---|---|
| FR | 2981045 A1 | 4/2013 |
| FR | 3000466 A1 | 7/2014 |
| GB | 2192163 A | 1/1988 |
| WO | 2010143051 A2 | 12/2010 |

OTHER PUBLICATIONS

"Enhanced energy maneuverability for attack helicopters using continuous, variable rotor speed control", C.G. Schaefer Jr., F.H. Lutze Jr., 47th Forum American Helicopter Society 1991; pp. 1293-1303, 171 pages.

* cited by examiner

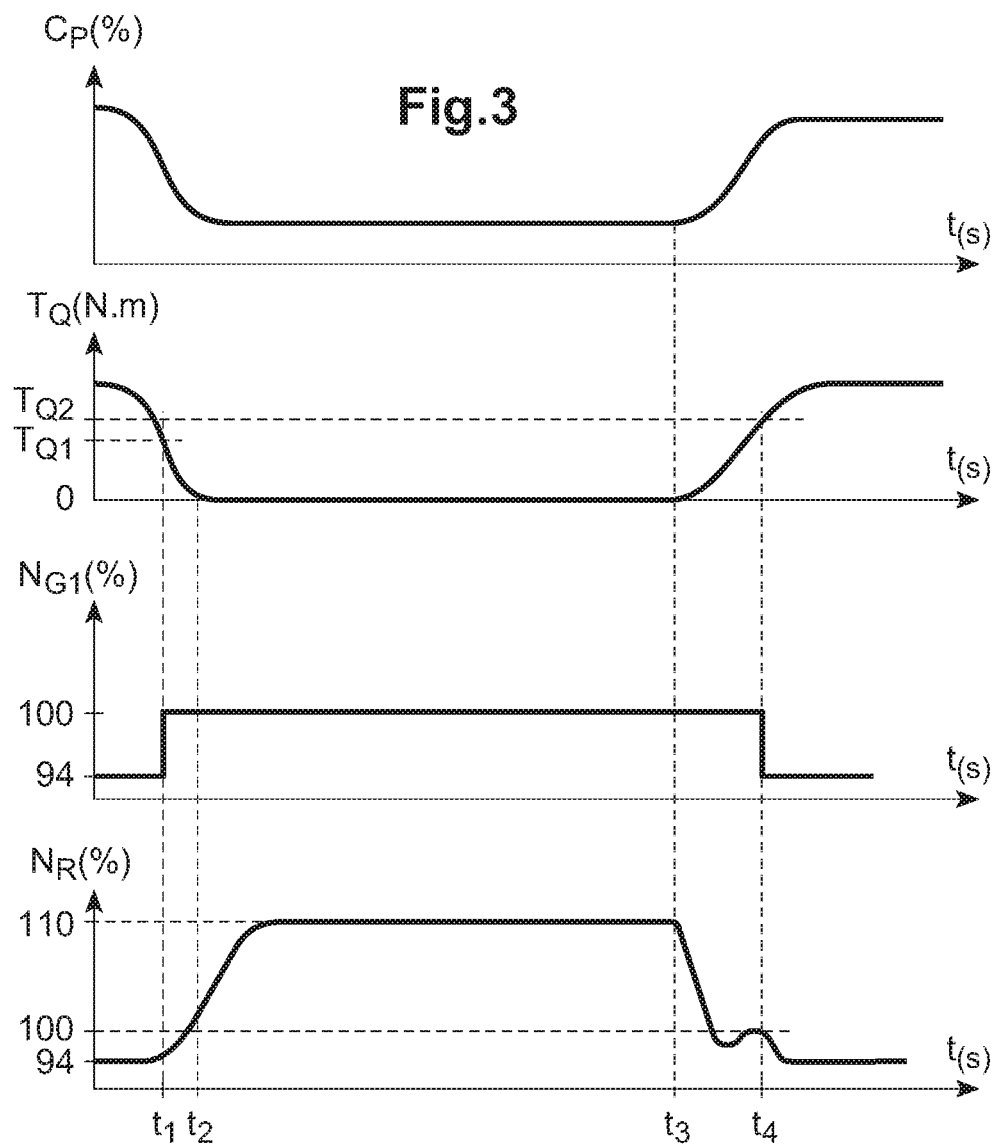
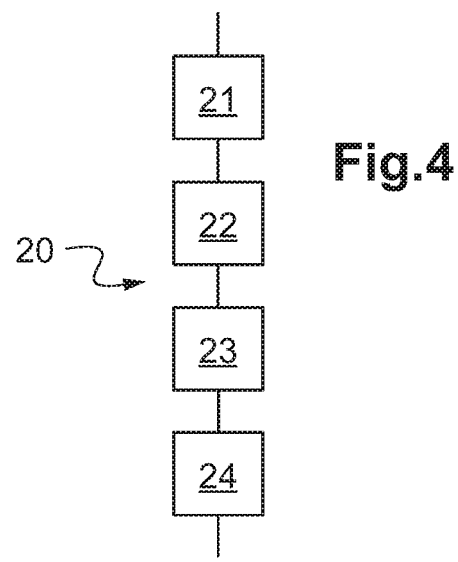

DEVICE FOR REGULATING THE SPEED OF ROTATION OF A GAS GENERATOR SHAFT OF A ROTORCRAFT TURBOSHAFT ENGINE, A ROTORCRAFT PROVIDED WITH SUCH A DEVICE, AND AN ASSOCIATED METHOD OF REGULATION

CROSS-REFERENCE TO RELATED APPLICATIONS

This application claims priority to French patent application No. FR 1601829 filed on Dec. 22, 2016, the disclosure of which is incorporated in its entirety by reference herein.

BACKGROUND OF THE INVENTION

(1) Field of the Invention

The present invention relates to a device for regulating the speed of rotation of the gas generator shaft of a rotorcraft turboshaft engine, referred to as the speed of rotation "NG". Such a speed of rotation NG is thus directly a function of the quantity of fuel injected into the engine in order to produce combustion for driving rotation at least of a main rotor.

Thus, the present invention also relates to the field of methods of regulating the operation of one or more turboshaft engines in a power plant of a rotorcraft. By way of example, such a power plant comprises at least one main combustion turboshaft engine conventionally delivering to the rotorcraft the mechanical power that it needs at least to drive one or more rotors of the rotorcraft.

Consequently, the present invention lies more specifically in the context of a regulator device and method that enable at least one main rotor of the rotorcraft, and possibly also when appropriate an anti-torque rotor, to be driven at a setpoint speed that is variable.

(2) Description of Related Art

Typically, the main rotor(s) provides the rotorcraft with lift, and possibly also with propulsion and/or with changes of flying altitude in the specific circumstances of a helicopter. The anti-torque rotor typically serves to stabilize and guide the rotorcraft in yaw and is commonly formed by a tail rotor or by at least one propulsive propeller for a hybrid type rotorcraft capable of flying at high speeds of advance.

Conventionally, the operation of the main turboshaft engines of the rotorcraft is under the control of a regulator unit such as a full authority digital engine control (FADEC). The regulator unit controls the amount of fuel metered to the main engine, e.g. as a function of a setpoint for the speed of rotation of the shaft of the gas generator of an engine, referred to below as the speed of rotation "NG", and relating to a speed of rotation that is required for the shaft of the gas generator of an engine. Under certain particular circumstances, the setpoint for the speed of rotation NG may be generated by the regulator unit (FADEC). In other particular circumstances, e.g. where the setpoint is variable, it may be generated by the electronic, electrical, and computer equipment on board the aircraft acting together and it may then be transmitted to the regulator unit (FADEC) by management means, such as an automatic flight control system (AFCS). Under such circumstances, the regulator unit (FADEC) serves to regulate the speed of rotation NG.

Thus, the setpoint for the speed of rotation NG may be transmitted by the management means (AFCS) as a function of the mechanical power requirements of the aircraft as identified depending on the current flight circumstances of the rotorcraft, and in particular as a function of the mechanical power requirements for driving the main rotor. By way of example, the power consumed by the main rotor may be identified by evaluating firstly the resisting torque that the main rotor opposes against being driven by the power plant, and secondly its speed of rotation.

In addition, driving the main rotor at a speed of rotation NR is directly a function of the speed of rotation NG of the shaft of the gas generator. The speed of rotation NG is thus controlled in variable manner relative to a nominal speed NGnom that is predefined depending on the most critical conditions for the rotorcraft, e.g. corresponding to short-duration complex procedures for takeoff or landing, commonly referred to by the term "CAT A procedures".

Specifically, such a significant variation in the drive speed NG of the shaft of the gas generator is used for optimizing the level of power delivered by the engine as a function of the associated stage of flight, e.g. in order to reduce sound nuisance close to the ground and/or in order to improve performance. By way of indication, the speed of rotation NG of the shaft of the gas generator may be controlled to vary over the range 5% to 10% of the nominal speed NGnom, or possibly even more, depending on technological advance, and more particularly it may be controlled to vary over a range of values that may potentially go from 90% to 115% of the nominal speed NGnom.

On this topic, reference may be made for example to the publication "Enhanced energy maneuverability for attack helicopters using continuous, variable rotor speed control" C. G. Schaefer Jr., F. H. Lutze Jr., $47^{th}$ Forum American Helicopter Society 1991; pp. 1293-1303). According to that document, the performance of a rotorcraft in a combat situation is improved by varying the drive speed of the main rotor depending on variation in the air speed of the rotorcraft.

Reference may also be made for example to Document U.S. Pat. No. 6,198,991 (Yamakawa et al.), that proposes reducing the sound nuisance generated by a rotorcraft approaching a landing point by varying the speed of rotation of the main rotor.

On this topic, reference may also be made for example to Document US 2007/118254 (G. W. Barnes et al.), that proposes varying the speed of rotation of the main rotor of a rotorcraft using two values referred to as low and high, under predefined threshold conditions for values of various parameters associated with previously identified conditions of flight of the rotorcraft.

Still by way of example, reference may also be made on this topic to the Document WO 2010/143051 (Agusta S P A et al.), which proposes varying the speed of rotation of a main rotor of a rotorcraft in compliance with a map previously drawn up depending on various flight conditions of the rotorcraft.

Finally, as described by the Applicant in Document FR 3 000 466, it is also known to use an altimeter for automatically controlling variation in the speed of rotation of a rotor over a range extending from 90% to 110% of a predetermined nominal value.

Furthermore, Documents FR 2 974 564, US 2014/200790, GB 2 192 163, and FR 2 981 045 describe other devices or methods for regulating the speed of rotation of a main rotor or of a tail rotor of a rotorcraft.

Nevertheless, although such documents describe devices or methods for regulating the speed of rotation NG of the shaft of the gas generator (or by analogy the speed of rotation NR of the rotor) while the rotorcraft is in flight, such documents do not provide any solution enabling the setpoint for the speed of rotation NG to be adapted during stages of flight at low power. However there exist two main situations that can lead a rotorcraft pilot to make the rotorcraft fly at low power levels.

The first situation corresponds to at least one engine of the rotorcraft failing suddenly, thereby giving rise to a loss of power and thus to the failed engine not being able to drive rotation of the main rotor(s).

The second situation is autorotation, which is a stage of flight that can be triggered voluntarily by the pilot of the rotorcraft. In this stage of flight, the main rotor is no longer driven by the engine(s): this can be referred to as "desynchronization". The rotor is no longer driven in rotation by the engine but rather by a reversal of the stream of air flowing through the rotor. Engine torque is then no longer transmitted from the engine to the rotor. Such a stage of flight then enables the rotorcraft to descend under control by appropriately controlling the collective pitch of the blades of the main rotor(s).

In general manner, a stage of flight in autorotation is used by a pilot in order to conserve a sufficient speed for the main rotor in the event of the engine(s) failing. This stage of flight is thus performed by reducing the collective pitch of the blades of the main rotor when the failure occurs. Changing to the stage of flight in autorotation is then made possible by an overrunning clutch or "freewheel" that enables the rotor to be decoupled from the engine under certain conditions. Such a freewheel is a mechanical connection part between the main gearbox and the engine and it serves to transmit power from the engine to the main gearbox while preventing power being transmitted the other way.

In general, two shafts engaged coaxially one in the other are connected together by means of the freewheel. One of the shafts is connected to the main gearbox which is itself connected to the main rotor, and the other shaft is connected to the engine. Those two shafts can then have a degree of freedom to move relative to each other in rotation or they may be constrained to move together in rotation. When they have freedom relative to each other, the rotor and the engine are said to be "desynchronized". This desynchronization takes place when the torque transmitted by the engine to the rotor is zero.

Usually, a pilot thus proceeds to perform a landing in autorotation when an engine failure occurs. Nevertheless, since such a maneuver is complex to perform, it is necessary for rotorcraft pilots to train regularly by simulating failure of the power plant.

Furthermore, while descending at high vertical speed, e.g. during steeply sloping approaches that are characteristic of rotorcraft, or indeed in the presence of gusts of wind, the engine may become desynchronized in unexpected manner and surprise the pilot. When the pilot manually increases the setpoint collective pitch for the blades of the rotor, the engine once more delivers non-zero torque. The speed of rotation NR of the rotor then drops and the engines (regulated on a free turbine setpoint, written NTL, for a turboshaft engine) become resynchronized with the rotor. Such a drop in the speed of rotation NR can then reach several percent of the nominal value NRnom for the speed of rotation.

In addition, generalizing relationships for regulating the rotor speed NR, known as "highly variable" relationships, for acoustic limitation requirements has led to new generations of rotorcraft flying with rotor speeds of rotation NR that are lower than their speeds during hovering flight, with this taking place from a speed of advance in level flight corresponding to the minimum power needed for flight and generally written by the abbreviation Vy.

For a given flight configuration, such a drop in the speed of rotation NR of the rotor on resynchronization is then even more troublesome when it takes place close to the ground, a zone in which the speed of rotation NR of the rotor is reduced in order to satisfy acoustic level constraints and in which the speed of rotation NR of the rotor has already been reduced to a value that might for example be as low as 90% of the nominal value NRnom. Such a drop then causes the speed of rotation NR to drop temporarily to very low levels, i.e. well below 97% of the nominal value NRnom, and thus dangerous for enabling a rotorcraft to be piloted.

The risk of unwanted desynchronization occurring during operations at high descent rates has led to rotorcraft of recent generations to display the collective pitch at which desynchronization will occur to the pilot on a first limit indicator (FLI). Nevertheless, if the level of activity of the pilot is already high, as happens typically during approach stages, the pilot might not see the display since the pilot needs to absorb numerous other visible indications or indeed might be looking outside the rotorcraft during this type of maneuver.

BRIEF SUMMARY OF THE INVENTION

An object of the present invention is thus to propose a device that makes it possible to be unaffected by the above-mentioned limitations. In particular, an object of the regulator method or device in accordance with the invention is thus to enable the speed of rotation NG of a shaft of the gas generator of a rotorcraft turboshaft engine to be regulated during stages of flight at low power.

The invention thus provides a regulator device for regulating a speed of rotation, referred to as the speed of rotation "NG", of a shaft of a gas generator of at least one turboshaft engine of such a rotorcraft, the rotorcraft comprising:

at least one main rotor for regulating at least lift and/or propulsion for the rotorcraft in the air;

a control member for controlling a collective pitch of the blades of the main rotor(s), the control member serving to generate a control setpoint for the collective pitch in order to control an angular orientation of the blades collectively relative to a hub of the main rotor(s);

at least one turboshaft engine suitable for driving rotation of the main rotor(s), the engine(s) producing, at least temporarily, a drive torque TQ that is transmitted to the main rotor(s), the drive torque TQ being suitable for varying as a function of the control setpoint for the collective pitch of the blades of the main rotor(s); and measurement means for taking at each instant a measurement of the drive torque TQ transmitted by the engine(s) to the main rotor(s).

The regulator device then generates at least one control relationship for controlling a control setpoint for the speed of rotation NG of the shaft of the gas generator of the engine(s), the control relationship(s) for controlling the control setpoint of the speed of rotation NG being a function of a speed of advance of the rotorcraft in a substantially horizontal direction, and of a height of the rotorcraft relative to the ground.

According to the invention, such a regulator device is remarkable in that it comprises:

input means connected to the measurement means, the input means enabling the regulator device to receive and analyze the measurement of the drive torque TQ;

at least one storage unit for storing a first threshold value TQ1 and a second threshold value TQ2, the second threshold value TQ2 being selected to be greater than the first threshold value TQ1; and a calculation unit for comparing the measurement of the drive torque TQ with the first and second threshold values TQ1 and TQ2, the calculation unit generating at least two control relationships NG1 and NG2 for the control setpoint for the speed of rotation NG, the at least two control relationships NG1 and NG2 being different from each other and being a function of the measurements of the drive torque TQ, a first control relationship NG1 being implemented at least when the measurement of the drive torque TQ is less than the first threshold value TQ1, and a second control relationship NG2 being implemented at least when the measurement of the drive torque TQ is greater than the second threshold value TQ2.

In other words, such a regulator device makes it possible continuously to compare a current value of the drive torque TQ with the first and second threshold values TQ1 and TQ2 and then automatically to modify the control relationship for the control setpoint for the speed of rotation NG depending on flight circumstances.

By way of example, the first control relationship NG1 may thus make it possible at least temporarily during stages of flight at low power to raise the control setpoint for the speed of rotation NG to the level of a nominal value when the torque transmitted by the engine to the main rotor(s) goes below the first threshold value TQ1.

Conversely, the second control relationship NG2 makes it possible, at least temporarily during stages of flight at low power, to reduce the control setpoint for the speed of rotation NG to a level below the nominal value, e.g. equal to 94% of the nominal value, when the torque transmitted by the engine to the main rotor(s) goes above the second threshold value TQ2. Under such circumstances, only the second control relationship NG2 makes it possible to satisfy acoustic level reduction requirements as a function of the height of the rotorcraft above the ground and as a function of the speed of advance of the rotorcraft in a substantially horizontal direction.

Thus, the second control relationship NG2 is preferably the control relationship implemented by default since it corresponds to stages of flight at normal power that are different from stages of flight at low power. Consequently, the second control relationship NG2 serves to limit the acoustic footprint of the rotorcraft on the outside medium.

The first control relationship NG1 is thus not the control relationship that is implemented by default and can then be implemented automatically and temporarily only if a flight condition at a low power level, or more precisely at a low torque level, occurs voluntarily if it corresponds to pilot training for autorotation flight of a rotorcraft, or involuntarily in the event of an engine failure, for example.

Furthermore, the means for measuring engine torque are generally referred to as a "torque meter" and advantageously comprise an electromagnetic sensor for measuring twist deformation of a shaft for transmitting the engine torque generated by the engine(s) of the rotorcraft. Such a sensor may be a Hall effect probe that generates electromagnetic pulses of duration that is a function of the relative positioning of complementary notches and teeth provided at the circumference of two facing parts, which parts are secured respectively to two ends of a shaft for transmitting engine torque.

The input means are generally formed by an electronic data acquisition card with which the electronic sensor can communicate to transmit a signal representative of its measurements. Such input means may then be connected by wired means with the measurement means or may indeed use a wireless communication module in order to communicate with the measurement means using a wireless communication protocol.

Advantageously, said first threshold value TQ1 may lie in the range 5% to 15% of a maximum torque value TQmax suitable for being generated by the engine(s).

Thus, such a first threshold value is suitable for corresponding to a stage of flight close to very low powers, which will lead to desynchronization between the engine(s) and the main rotor(s) if the pilot continues with this maneuver. It is then certain to be able to detect a flight situation that needs the control setpoint for the speed of rotation NG to be modified. This modification then makes it possible either to alert the pilot that desynchronization will arise shortly if the maneuver was not voluntarily, or else to be in a position to anticipate and to mitigate the drop in the speed of rotation NG of the shaft of the gas generator that will take place after resynchronization.

In practice, said second threshold value TQ2 may lie in the range 10% to 20% of a maximum torque value TQmax suitable for being generated by the engine(s).

In this way, the second threshold value TQ2 is large enough to identify a stage of flight that is distinct and remote from the instant of desynchronization between the engine(s) and the main rotor(s). Consequently, it is certain that a need requiring the control setpoint for the speed of rotation NG to be modified is not close.

In a particular embodiment of the invention, the regulator device may implement the first control relationship NG1 when the measurement of the drive torque TQ passes below the first threshold value TQ1 and so long as the measurement of the drive torque TQ remains below the second threshold value TQ2.

In other words, the first control relationship NG1 is implemented for a duration that is not determined and that is a function of the current value of the drive torque TQ.

According to an advantageous characteristic of the invention, the regulator device may implement the second control relationship NG2 when the measurement of the drive torque TQ passes above the second threshold value TQ2 and so long as the measurement of the drive torque TQ remains above the first threshold value TQ1.

In analogous manner, the second control relationship NG2 is implemented for a duration that is not determined and that is a function of the current value of the drive torque TQ.

As mentioned above, the invention also relates to a rotorcraft comprising:

at least one main rotor for regulating at least lift and/or propulsion for the rotorcraft in the air;

a control member for controlling a collective pitch of the blades of the main rotor(s), the control member serving to generate a control setpoint for the collective pitch in order to control an angular orientation of the blades collectively relative to a hub of the main rotor(s);

at least one turboshaft engine suitable for driving rotation of the main rotor(s), the engine(s) producing, at least temporarily, a drive torque TQ that is transmitted to the main rotor(s), the drive torque TQ being suitable for varying as a function of the control setpoint for the collective pitch of the blades of the main rotor(s);

measurement means for taking at each instant a measurement of the drive torque TQ transmitted by the engine(s) to the main rotor(s); and a regulator device generating at least one control relationship for a control setpoint for a speed of rotation, referred to as the speed of rotation "NG", of a shaft of a gas generator of the engine(s), the control relationship(s) for controlling the control setpoint of the speed of rotation NG being a function of a speed of advance V of the rotorcraft in a substantially horizontal direction Y, and of a height z of the rotorcraft relative to the ground S.

According to the invention, such a rotorcraft is remarkable in that the regulator device for regulating the speed of rotation NG is as described above.

The invention also relates to a regulation method for regulating a speed of rotation, referred to as the speed of rotation "NG", of a shaft of a gas generator of at least one turboshaft engine of a rotorcraft, such a rotorcraft comprising:

at least one main rotor for regulating at least lift and/or propulsion for the rotorcraft in the air;

a control member for controlling a collective pitch of the blades of the main rotor(s), the control member serving to generate a control setpoint for the collective pitch in order to control an angular orientation of the blades collectively relative to a hub of the main rotor(s);

at least one turboshaft engine suitable for driving rotation of the main rotor(s), the engine(s) producing, at least temporarily, a drive torque TQ that is transmitted to the main rotor(s), the drive torque TQ being suitable for varying as a function of the control setpoint for the collective pitch of the blades of the main rotor(s); and measurement means for taking at each instant a measurement of the drive torque TQ transmitted by the engine(s) to the main rotor(s).

In addition, such a regulation method generates at least one control relationship for controlling a control setpoint for the speed of rotation NG of the shaft of the gas generator of the engine(s), the control relationship(s) for controlling the control setpoint of the speed of rotation NG being a function of a speed of advance of the rotorcraft in a substantially horizontal direction, and of a height of the rotorcraft relative to the ground.

According to the invention, this regulation method is remarkable in that it implements:

a storage step for storing in at least one storage unit a first threshold value TQ1 and a second threshold value TQ2, the second threshold value TQ2 being selected to be greater than the first threshold value TQ1;

a reception step for receiving the measurement of the drive torque TQ taken by the measurement means;

a comparison step for comparing the measurement of the drive torque TQ with the first and second threshold values TQ1 and TQ2; and a generation step for generating at least two control relationships NG1 and NG2 for the control setpoint for the speed of rotation NG, the at least two control relationships NG1 and NG2 being different from each other and being a function of the measurements of the drive torque TQ, a first control relationship NG1 being implemented at least when the measurement of the drive torque TQ is less than the first threshold value TQ1, and a second control relationship NG2 being implemented at least when the measurement of the drive torque TQ is greater than the second threshold value TQ2.

In other words, the storage step consists in putting the threshold values TQ1 and TQ2 into a memory. By way of example, these threshold values TQ1 and TQ2 may be values that are fixed or indeed that are variable and that are determined in application of relationships that are functions of external parameters, such as wind force, air temperature, or indeed atmospheric pressure.

The step of receiving the measurement of the drive torque TQ enables the regulator device to receive the current value of the drive torque TQ that is actually being transmitted by the engine(s) to the main rotor(s).

The comparison step then makes it possible to compare this current value for the drive torque TQ with the first and second threshold values TQ1 and TQ2.

Finally, the generation step serves to generate the first and second control relationships NG1 and NG2 so as to be able subsequently to implement them individually as a function of the measurement of the current value of the drive torque.

Advantageously, the first threshold value TQ1 may lie in the range 5% to 15% of a maximum torque value TQmax suitable for being generated by the engine(s). In contrast, and as mentioned above, the second threshold value TQ2 may lie in the range 10% to 20% of a maximum torque value TQmax suitable for being generated by the engine(s).

According to an advantageous characteristic of the invention, the regulation method may implement the first control relationship NG1 when the measurement of the drive torque TQ passes below the first threshold value TQ1 and so long as the measurement of the drive torque TQ remains below the second threshold value TQ2.

In other words, the first control relationship NG1 is implemented by the regulation method for a duration that is not determined and that is a function of the current value of the drive torque TQ.

Likewise, the regulation method may implement the second control relationship NG2 when the measurement of the drive torque TQ passes above the second threshold value TQ2 and so long as the measurement of the drive torque TQ remains above the first threshold value TQ1.

Consequently, the second control relationship NG2 is implemented by the regulation method for a duration that is not determined and that is a function of the current value of the drive torque TQ.

BRIEF DESCRIPTION OF THE DRAWINGS

The invention and advantages appear in greater detail from the following description of examples given by way of non-limiting indication and with reference to the accompanying figures, in which:

FIG. 3 shows curves illustrating regulation of the speed of rotation NG of a shaft of a gas generator of a rotorcraft turboshaft engine and corresponding regulation of the speed of rotation NR of a rotor, in accordance with the invention; and FIG. 4 is a block diagram of a method of regulation in accordance with the invention.

Elements present in more than one of the figures are given the same references in each of them.

DETAILED DESCRIPTION OF THE INVENTION

As mentioned above, the invention relates to the field of aircraft having at least one main rotor enabling the rotorcraft to be provided at least with lift.

Figure 1:
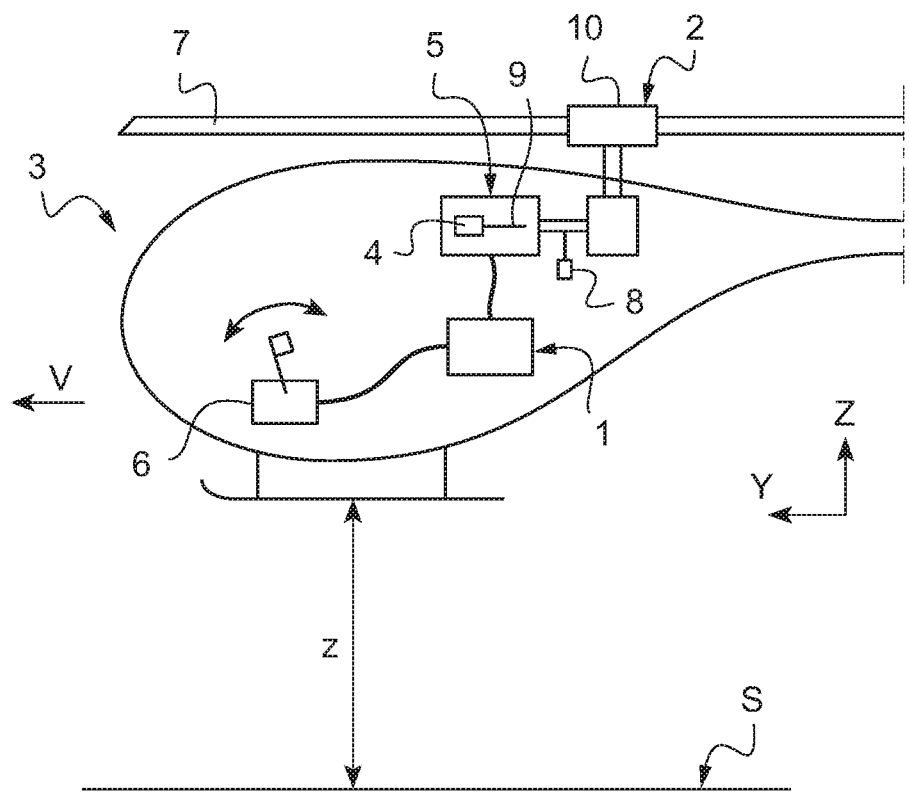
FIG. 1 is a diagrammatic side view of a rotorcraft in accordance with the invention.

As shown in FIG. 1, such a rotorcraft 3 includes a regulator device 1 for regulating the speed of rotation NG of a shaft 9 of a gas generator 4. Such a shaft 9 of the gas generator 4 is arranged inside a turboshaft engine 5 for driving rotation of a free turbine that is secured to an outlet shaft in order to drive rotation of at least a main rotor 2 of the rotorcraft 3. Thus, the engine 5 driving the main rotor 2 in rotation transmits drive torque TQ that may vary as a function of conditions and stages of flight.

The main rotor comprises a hub 10 from which blades 7 extend substantially radially. Rotating such a main rotor 2 thus enables a substantially vertical air stream to be produced, thereby generating at least lift in the air for the rotorcraft 3.

The rotorcraft 3 can be piloted in particular by using a control member 6 for controlling a collective pitch of the blades 7 of the main rotor 2. This control member 6 thus enables a collective pitch control setpoint Cp to be generated and thus enables the angular orientation of the blades 7 relative to the hub 10 to be modified simultaneously. The control setpoint Cp for the collective pitch of the blades 7 serves in particular to vary the drive torque TQ that is transmitted by the engine 5 to the main rotor 2.

Measurement means 8 then serve at all times to measure the drive torque TQ. Such measurement means 8 are generally formed by electromagnetic sensors such as torque meters measuring twist deformation of an outlet shaft of the engine 5.

Such a regulator device 1 thus enables at least one relationship to be generated for controlling a setpoint for the speed of rotation NG of the shaft 9 of the gas generator 4 of the engine 5, this control relationship being a function firstly of a speed of advance V of the rotorcraft 3 in a substantially horizontal direction Y, and secondly of a height z of the rotorcraft above the ground S. Such a speed of advance V of the rotorcraft 3 is variable and may exceed a predetermined threshold value Vy corresponding to a particular speed of advance enabling the rotorcraft to fly with a minimum level of power from the engine.

Specifically, in order to limit the acoustic footprint of a rotorcraft at a height above the ground of less than 600 feet, for example, and when the speed of advance V of the rotorcraft 3 is greater than the predetermined threshold value Vy, it is advantageous to reduce the control setpoint for the speed of rotation NG. Such a reduction in the control setpoint for the speed of rotation NG then also leads to a reduction in the level of sound (decibels) generated by the rotorcraft 3.

Figure 2:
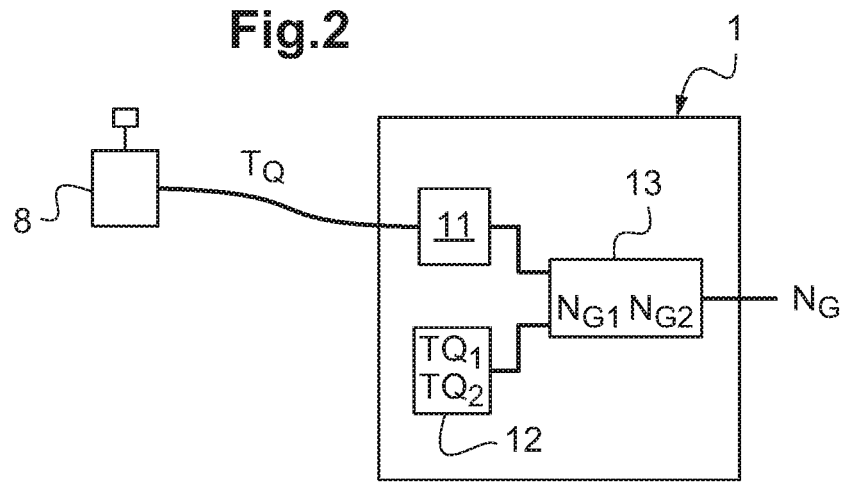
FIG. 2 is a block diagram showing in particular a regulator device in accordance with the invention.

Furthermore, and as shown in FIG. 2, the regulator device 1 includes input means 11 connected to the measurement means 8 and enabling the regulator device 1 to receive and analyze the measurement of the drive torque TQ. Furthermore, the regulator device 1 also includes at least one storage unit 12 for storing a first threshold value TQ1 and a second threshold value TQ2. The second threshold value TQ2 is selected to be greater than the first threshold value TQ1.

Such a regulator device 1 also has a calculation unit 13 for comparing the measurement of the engine torque TQ with the first and second threshold values TQ1 and TQ2. This calculation unit 13 then generates at least two control relationships NG1 and NG2 for the setpoint for controlling the speed of rotation NG. The at least two control relationships NG1 and NG2 are selected to be different from each other and to be a function of the measurement of the drive torque TQ. A first control relationship NG1 is thus implemented at least when the measurement of the engine TQ is less than a first threshold value TQ1, and a second control relationship NG2 is implemented at least when the measurement of said drive torque TQ is greater than the second threshold value TQ2.

As mentioned above, and as shown in FIG. 3, the drive torque TQ for a given flight situation is a function of the control setpoint Cp for the collective pitch of the blades 7 of the main rotor 2.

Thus, when the pilot of the rotorcraft 3 begins to reduce the control setpoint Cp for the collective pitch of the blades 7, the drive torque TQ transmitted to the main rotor 2 also decreases. At an instant t1, the drive torque TQ is then equal to the first threshold value TQ1 and it then continues to decrease below the first threshold value TQ1.

Likewise, at the instant t1, the control relationship NG1 for the control setpoint for the speed of rotation NG then passes automatically from a low value of 94% in order to comply with acoustic requirements to a nominal value of 100%.

At instant t2, the drive torque transmitted to the main rotor 2 becomes zero, thus leading to the beginning of a stage of desynchronization between the engine 5 and the main rotor 2. Furthermore, the speed of rotation NR of the main rotor 2 continues to increase up to a maximum value, which may for example correspond to 110% of the nominal value. Specifically, this increase in the real speed of rotation NR of the main rotor 2 is generated by the stream of air passing through the rotor that is caused by the rapid descent of the rotorcraft 3.

Thereafter, as from an instant t3, action on the control member 6 for controlling the collective pitch of the blades 7 then generates an increase in the setpoint Cp for the collective pitch, and consequently an increase in the drive torque TQ transmitted to the main rotor 2.

Still from the instant t3, the real speed of rotation NR of the main rotor 2 drops and the main rotor 2 begins progressively to be driven in rotation by the engine 5 towards a nominal speed of rotation of 100%, temporarily preventing the drop in the real speed of rotation NR below the minimum value of 94%, at which the main rotor 2 was initially being driven prior to the instant t1.

Finally, as from instant t4, corresponding to a measurement of the drive torque TQ equal to the second threshold value TQ2, the control relationship NG1 for the setpoint for the speed of rotation NG is then decreased from its nominal value of 100% to a low value of 94% enabling the sound level (decibels) produced by the rotorcraft 3 in flight to be reduced.

As shown in FIG. 4, the invention also provides a regulation method 20 enabling at least one control relationship to be generated for a setpoint for controlling the speed of rotation NG of the shaft 9 of the gas generator 4 of the engine 5. Such a control relationship for the setpoint controlling the speed of rotation NG is a function of a speed of advance V of the rotorcraft 3 in a substantially horizontal direction, and of a height z of the rotorcraft 3 relative to the ground S.

Such a regulation method 20 implements:

a storage step 21 for storing in at least one storage unit 12 a first threshold value TQ1 and a second threshold value TQ2, the second threshold value TQ2 being selected to be greater than the first threshold value TQ1;

a reception step 22 for receiving the measurement of the drive torque TQ taken by the measurement means 8;

a comparison step 23 for comparing the measurement of the drive torque TQ with the first and second threshold values TQ1 and TQ2; and a generation step 24 for generating the at least two control relationships NG1 and NG2 for the control setpoint for controlling the speed of rotation NG.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A regulator device for regulating a speed of rotation of a shaft of a gas generator of at least one turboshaft engine of a rotorcraft, the rotorcraft including:
   at least one main rotor for regulating at least lift and/or propulsion for the rotorcraft in the air;
   a control member for controlling a collective pitch of blades of the at least one main rotor, the control member serving to generate a control setpoint for the collective pitch to control an angular orientation of the blades collectively relative to a hub of the at least one main rotor;
   at least one turboshaft engine suitable for driving rotation of the at least one main rotor, the at least one turboshaft engine producing, at least temporarily, a drive torque that is transmitted to the at least one main rotor, the drive torque being suitable for varying as a function of the control setpoint for the collective pitch of the blades of the at least one main rotor; and
   measurement means for taking at each instant a measurement of the drive torque transmitted by the at least one turboshaft engine to the at least one main rotor;
   the regulator device comprising:
   a controller for generating at least one control relationship for controlling a control setpoint for the speed of rotation of the shaft of the gas generator of the at least one turboshaft engine, the at least one control relationship for controlling the control setpoint of the speed of rotation being a function of (i) speed of advance of the rotorcraft in a substantially horizontal direction and of (ii) a height of the rotorcraft relative to the ground;
   input means connected to the measurement means, the input means enabling the regulator device to receive and analyze the measurement of the drive torque;
   at least one storage unit for storing a first threshold value and a second threshold value, the second threshold value being selected to be greater than the first threshold value; and
   a calculation unit for comparing the measurement of the drive torque with the first and second threshold values, the calculation unit generating at least first and second control relationships for the control setpoint for the speed of rotation, the at least first and second control relationships being different from each other and being a function of measurements of the drive torque, the first control relationship being implemented by the regulator device for controlling the control setpoint of the speed of rotation at least when the measurement of the drive torque is less than the first threshold value, and the second control relationship being implemented by the regulation device for controlling the control setpoint of the speed of rotation at least when the measurement of the drive torque is greater than the second threshold value.

2. The regulator device according to claim 1, wherein the first threshold value lies in the range 5% to 15% of a maximum torque value suitable for being generated by the at least one turboshaft engine.

3. The regulator device according to claim 1, wherein the second threshold value lies in the range 10% to 20% of a maximum torque value suitable for being generated by the at least one turboshaft engine.

4. The regulator device according to claim 1, wherein the regulator device implements the first control relationship for controlling the control setpoint of the speed of rotation when the measurement of the drive torque passes below the first threshold value and so long as the measurement of the drive torque remains below the second threshold value.

5. The regulator device according to claim 1, wherein the regulator device implements the second control relationship for controlling the control setpoint of the speed of rotation when the measurement of the drive torque passes above the second threshold value and so long as the measurement of the drive torque remains above the first threshold value.

6. A rotorcraft comprising:
   at least one main rotor for regulating at least lift and/or propulsion for the rotorcraft in the air;
   a control member for controlling a collective pitch of blades of the at least one main rotor, the control member serving to generate a control setpoint for the collective pitch to control an angular orientation of the blades collectively relative to a hub of the at least one main rotor;
   at least one turboshaft engine suitable for driving rotation of the at least one main rotor, the at least one turboshaft engine producing, at least temporarily, a drive torque that is transmitted to the at least one main rotor, the drive torque being suitable for varying as a function of the control setpoint for the collective pitch of the blades of the at least one main rotor;
   measurement means for taking at each instant a measurement of the drive torque transmitted by the at least one turboshaft engine to the at least one main rotor; and
   a regulator device generating at least one control relationship for controlling a control setpoint for a speed of rotation of a shaft of a gas generator of the at least one turboshaft engine, the at least one control relationship for controlling the control setpoint of the speed of rotation being a function of (i) a speed of advance of the rotorcraft in a substantially horizontal direction and of (ii) a height of the rotorcraft relative to the ground;
   wherein the regulator device includes:
     input means connected to the measurement means, the input means enabling the regulator device to receive and analyze the measurement of the drive torque;
     at least one storage unit for storing a first threshold value and a second threshold value, the second threshold value being selected to be greater than the first threshold value; and
     a calculation unit for comparing the measurement of the drive torque with the first and second threshold values, the calculation unit generating at least first and second control relationships for the control setpoint for the speed of rotation, the at least first and second control relationships being different from each other and being a function of measurements of the drive torque, the first control relationship being implemented by the regulator device for controlling the control setpoint of the speed of rotation at least when the measurement of the drive torque is less than the first threshold value, and the second control relationship being implemented by the regulator device for controlling the control setpoint of the speed of rotation at least when the measurement of the drive torque is greater than the second threshold value.

7. A regulation method for regulating a speed of rotation of a shaft of a gas generator of at least one turboshaft engine of a rotorcraft, the rotorcraft including:
- at least one main rotor for regulating at least lift and/or propulsion for the rotorcraft in the air;
- a control member for controlling a collective pitch of blades of the at least one main rotor, the control member serving to generate a control setpoint for the collective pitch to control an angular orientation of the blades collectively relative to a hub of the at least one main rotor;
- at least one turboshaft engine suitable for driving rotation of the at least one main rotor for generating at least lift and/or propulsion for the rotorcraft, the at least one turboshaft engine producing, at least temporarily, a drive torque that is transmitted to the at least one main rotor, the drive torque being suitable for varying as a function of the control setpoint for the collective pitch of the blades of the at least one main rotor; and
- measurement means for taking at each instant a measurement of the drive torque transmitted by the at least one turboshaft engine to the at least one main rotor;

the regulation method comprising:
- generating at least one control relationship for controlling a control setpoint for the speed of rotation of the shaft of the gas generator of the at least one turboshaft engine, the at least one control relationship for controlling the control setpoint of the speed of rotation being a function of (i) a speed of advance of the rotorcraft in a substantially horizontal direction and of (ii) a height of the rotorcraft relative to the ground;
- a storage step for storing in at least one storage unit a first threshold value and a second threshold value, the second threshold value being selected to be greater than the first threshold value;
- a reception step for receiving the measurement of the drive torque taken by the measurement means;
- a comparison step for comparing the measurement of the drive torque with the first and second threshold values;
- a generation step for generating at least first and second control relationships for the control setpoint for the speed of rotation, the at least first and second control relationships being different from each other and being a function of measurements of the drive torque; and
- an implementation step for implementing the first control relationship for controlling the control setpoint of the speed of rotation at least when the measurement of the drive torque is less than the first threshold value and for implementing the second control relationship for controlling the control setpoint of the speed of rotation at least when the measurement of the drive torque is greater than the second threshold value.

8. The regulation method according to claim 7, wherein the first threshold value lies in the range 5% to 15% of a maximum torque value suitable for being generated by the at least one turboshaft engine.

9. The regulation method according to claim 7, wherein the second threshold value lies in the range 10% to 20% of a maximum torque value suitable for being generated by the at least one turboshaft engine.

10. The regulation method according to claim 7, wherein the implementation step further includes implementing the first control relationship for controlling the control setpoint of the speed of rotation when the measurement of the drive torque passes below the first threshold value and so long as the measurement of the drive torque remains below the second threshold value.

11. The regulation method according to claim 7, wherein the implementation step further includes implementing the second control relationship for controlling the control setpoint of the speed of rotation when the measurement of the drive torque passes above the second threshold value and so long as the measurement of the drive torque remains above the first threshold value.

* * * * *